United States Patent
Bisi et al.

(10) Patent No.: US 6,267,221 B1
(45) Date of Patent: Jul. 31, 2001

(54) CONVEYING SYSTEM FOR CARRYING CONTAINERS, ESPECIALLY BOTTLES, THROUGH DIFFERENT WORKING STATIONS

(75) Inventors: Alessandro Bisi, Argelato; Gianfranco Salmi, Bologna, both of (IT)

(73) Assignee: I.M.A. Industria Macchine Automatiche S.p.a., Ozzano Emilia (IT)

(*) Notice: Subject to any disclaimer, the term of this patent is extended or adjusted under 35 U.S.C. 154(b) by 0 days.

(21) Appl. No.: 09/319,331
(22) PCT Filed: Dec. 4, 1997
(86) PCT No.: PCT/IB97/01507
§ 371 Date: Jun. 3, 1999
§ 102(e) Date: Jun. 3, 1999
(87) PCT Pub. No.: WO98/25840
PCT Pub. Date: Jun. 18, 1998

(30) Foreign Application Priority Data

Dec. 12, 1996 (IT) .............................. BO96A0651

(51) Int. Cl.[7] .............................. B65G 21/20; B65G 7/00
(52) U.S. Cl. .................. 198/359; 198/735.1; 198/836.1
(58) Field of Search .............................. 198/735.1, 735.5, 198/725, 359, 360, 836.3

(56) References Cited

U.S. PATENT DOCUMENTS

| 1,729,237 | * | 9/1929 | Albertoli | 198/725 |
|---|---|---|---|---|
| 1,764,663 | * | 6/1930 | Voigt | 198/360 |
| 2,834,455 | * | 5/1958 | Marantz | 198/532 |
| 3,026,662 | * | 3/1962 | Largen et al. | 198/346.2 |
| 3,268,056 | * | 8/1966 | McCollough, Jr. | 198/359 |
| 3,599,776 | * | 8/1971 | Babunovic et al. | 198/480.1 |
| 3,701,410 | * | 10/1972 | Shields | 198/740 |
| 3,783,990 | * | 1/1974 | Siciliano | 198/725 |
| 3,783,994 | * | 1/1974 | Tomalty | 198/803.8 |
| 4,330,018 | * | 5/1982 | Sterel | 198/725 |
| 4,798,277 | * | 1/1989 | Dubuit et al. | 198/397.05 |
| 4,895,241 | * | 1/1990 | Silenius | 198/359 |
| 5,197,586 | * | 3/1993 | Marti Sala | 198/462.3 |
| 5,919,028 | * | 7/1999 | Edqvist | 198/394 |
| 5,927,480 | * | 7/1999 | McCaffrey et al. | 198/836.3 |
| 6,050,396 | * | 4/2000 | Moore | 198/836.3 |

FOREIGN PATENT DOCUMENTS

| 2 311 927 | 9/1974 | (DE) . |
|---|---|---|
| 25 48 613 | 5/1977 | (DE) . |
| 1591106 | 6/1970 | (FR) . |
| 1592861 | 6/1970 | (FR) . |

* cited by examiner

Primary Examiner—Christopher P. Ellis
Assistant Examiner—Paul T. Chin
(74) Attorney, Agent, or Firm—William J. Sapone; Coleman Sudol Sapone P.C.

(57) ABSTRACT

A conveyor includes a support element (4), that defines a running surface (5), and an endless dragging belt (9,10). The belt (9,10) has seats (3) made, with inwards decreasing section, along one longitudinal edge located over a corresponding section of the surface (5). Containers (1) to be moved rest on the surface (5) and are kept in engagement with the belt (9,10) and in the seats by a lateral striker (7). The belt can be made of synthetic material with cogs (11), or of metallic material with smooth surfaces. The lateral striker (7) is a bar parallel to the straight active run (8) of the belt (9,10), and is moved in relation to the containers (1) size. The support and running surface (5) has indentations in one or more points (4), where there are plates (13) for moving the containers clear of the belt so as to allow additional operations on the containers.

6 Claims, 2 Drawing Sheets

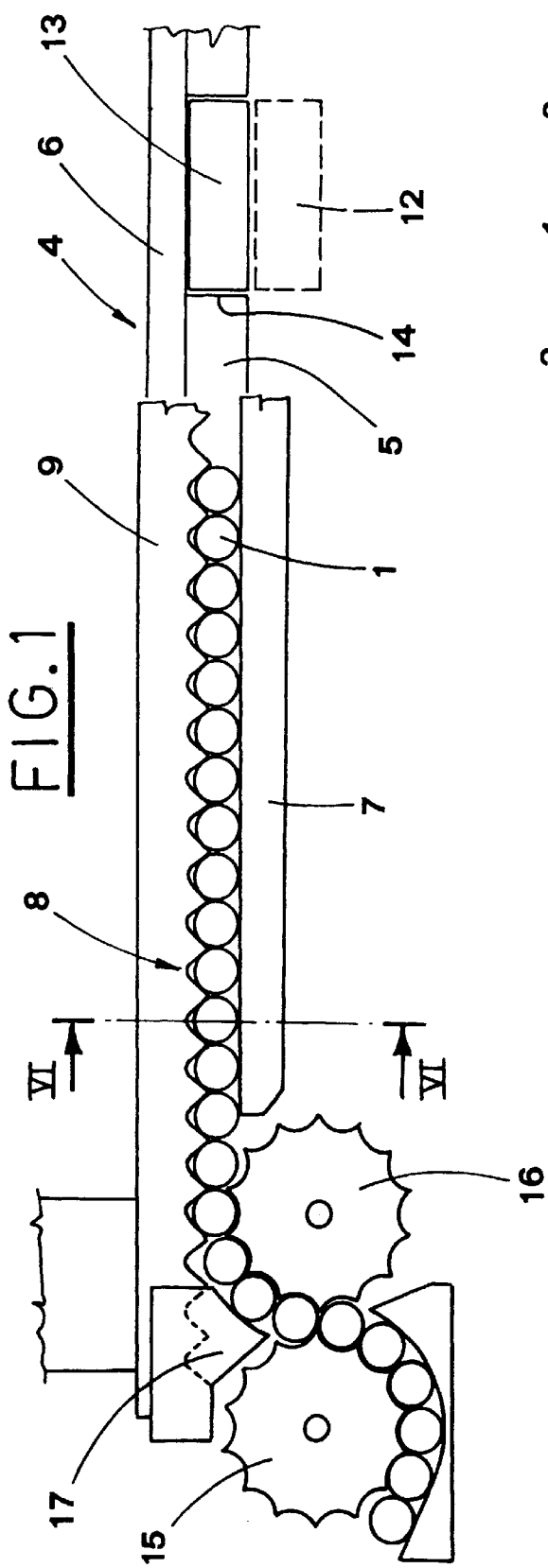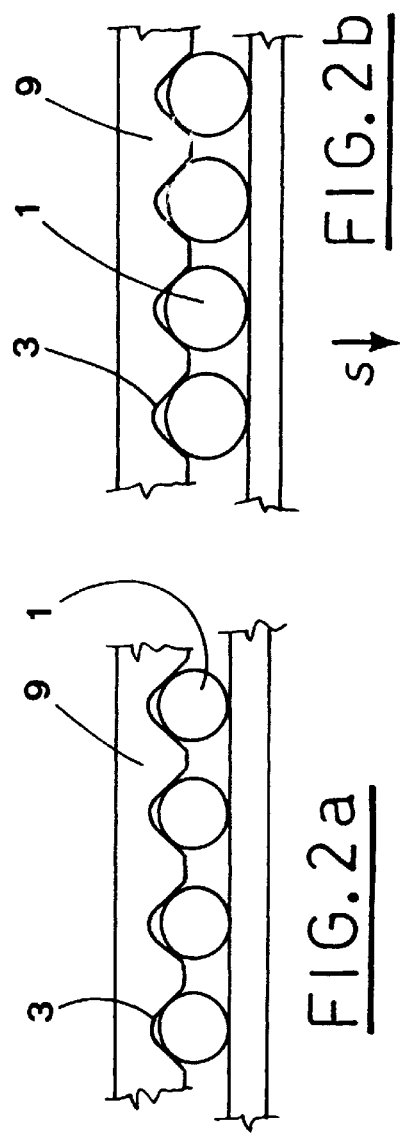

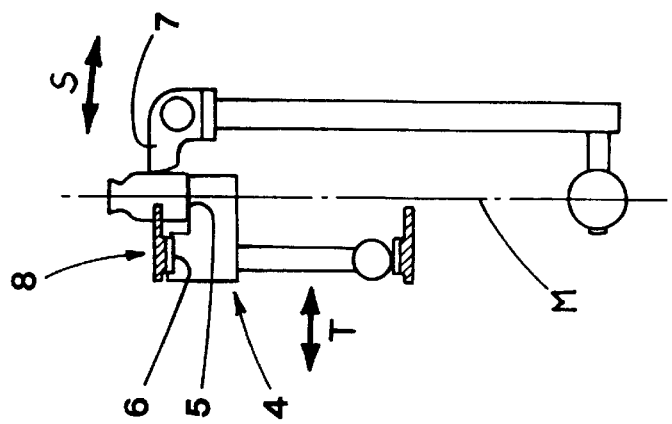
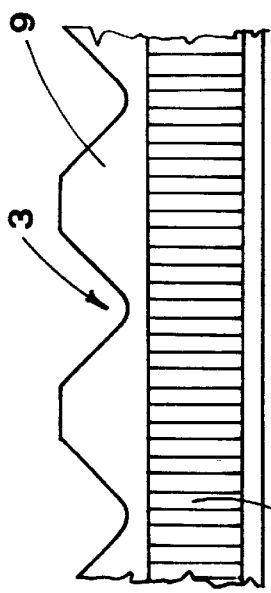
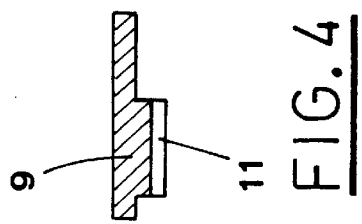
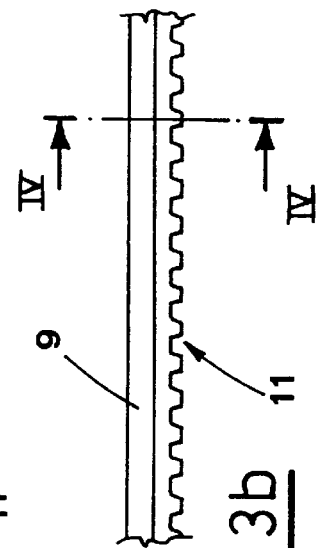
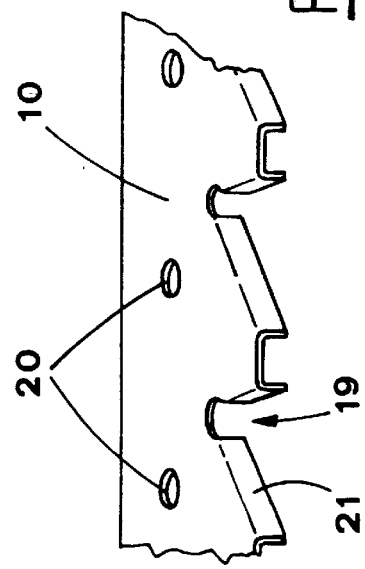

CONVEYING SYSTEM FOR CARRYING CONTAINERS, ESPECIALLY BOTTLES, THROUGH DIFFERENT WORKING STATIONS

BACKGROUND OF THE INVENTION

The present invention relates to a conveying device for containers, in particular bottles, which are to move through a series of subsequent working stations.

The working stations include, for instance, one or more filling stations, one or more weighing stations, closing station etc.

DESCRIPTION OF THE PRIOR ART

It is known that in some production fields, like e.g. drug production, it is necessary to work in sterile environment, so that the products are free of impurities.

This requirement is met by a widespread technique, known as "closed environment systems", according to which the machine is contained inside a stationary structure, called isolator, closed and sterilised thereinside.

Operators work outside the isolator and use suitable extensible gloves extended thereinside and accessible from outside in order to perform operations inside the isolator.

Otherwise, sterile or clean chambers are used, in which the operators, properly protected by sterile overalls, work directly on the machine.

The sterile chamber is usually placed in the centre of a system of stations provided with an increasing degree of sterility, going from outside toward inside, protecting one another.

Usually, flow-controlled suitably filtered air passes in the sterile stations.

It is helpful to specify that sterile environments are identified according to a conventional class, which according to the US regulation FS209E, results from the number of pollution particles, microbes and other inorganic parts present in a unit of air (in this case a cubic foot equal to 0.0283 cubic meters).

Using the above mentioned sterile stations, it is necessary to avoid as much as possible the presence of pollution sources.

In particular, it is generally required that the machines working in sterile stations be not equipped with moving means which use, during normal operation, prismatic guides.

For this purpose, engines equipped with these guides along which they reciprocate, are generally contained inside hermetic structures separated from the sterile station and called grey or non-clean environments.

Anyway, the sterile environments are sterilised, with predetermined frequency, by means of suitable disinfectants and the like.

Other types of conveying lines, that are designed for transportation of the above mentioned containers, use movable running surfaces for the containers to be moved.

Those skilled in this field would notice immediately the problems resulting from this type of conveying systems, especially concerning production and subsequent effectiveness of the conveyors including movable supporting surfaces.

Other solutions provide stationary supporting surfaces equipped with suitable dragging means for moving the containers.

Basically, the dragging means include one or more belts made of synthetic or metallic material with extensions applied thereto.

Pairs of adjacent extensions form seats for housing the containers moved by the belt.

The publication DE-A-3209790 discloses a filling device equipped with a bottle conveyor systems made according to different embodiments.

In some of the embodiments described in this document, the conveyor system includes a stationary support surface and a belt or a chain with fastened thereto means for picking up or pushing the bottles.

It is obvious that the construction of this type of dragging means is extremely difficult and complicated, and therefore increases the device global production cost.

Also the effectiveness of the systems which use this type of dragging means is hindered by possible difficulties resulting from the behaviour of extensions, picking up and pushing means carried by a belt or a chain, particularly with respect to bottles of different shapes.

In particular this last mentioned problem is considerably serious and very often can be solved only by substitution of the belt equipped with extensions with another more appropriate belt with extensions of different shape and/or mutually spaced with a different distance.

According to a particular embodiment, the dragging means include a rigid segment with semicircular seats, inside which the bottles are pushed by a striker placed opposite to the segment.

The segment is moved with reciprocating motion both lengthwise, with a stroke at least equal to the distance between two seats, and sidewise, so as to describe a rectangular trajectory.

It is evident that this type of the conveyor can be used only with bottles which have to move in an intermittent way.

Moreover, it is evident that the construction of this type of dragging means is extremely difficult and complicated, and therefore increases the global production cost of the conveying system.

Moreover, it is not possible to perform additional operations on the containers, if there are not provided complex devices for picking up single containers in different areas of the conveying surface.

The German publication DE-A-2548613 discloses a tooth belt conveyor for bottles which has radial paddle attachment and belt drums and with radial clearance slots for attachment clamps.

The transfer belt conveyor is for vertical objects such as bottles and the radial paddles are attached to the outside of the conveyor belt. The paddle attachments are guided above and below by right angle edges which are part of the conveyor frame cover panels. The conveyor belt has internal teeth so that they match the drive and location drum. The drum has also radial clearance slots which are provided for the paddle attachment clamps. A bar longitudinal parallel to the belt keeps the bottle in between the paddles while they are moved. At the conveyor exit, the upright bottles are taken over by a transfer rotor.

SUMMARY OF THE INVENTION

A main object of the present invention is to provide a conveying system of the above described type, with characteristics which simplify its production and, at the same time, improve its effectiveness.

Another object of the present invention is to provide a device that can be adapted widely and easily to all possible shapes of containers to be conveyed, without complicated substitution and/or adjustment operations.

The above mentioned objects are obtained by a conveying device including:

- at least one stationary support element which defines a support and running surface for these containers;
- at least one dragging element designed to engage and move the containers resting on the support and running surface;
- at least one lateral striker for the containers, for enabling the dragging means to engage and move the containers;

the conveyor is characterized in that:

- the dragging element is formed by an endless motorised belt having an active straight run situated over a longitudinal edge of the support element;
- the edge of the active straight run which is turned toward the lateral striker is provided with seats regularly spaced out and situated over a corresponding section of the support and running surface;
- the width of the seats decreases while they extend inwards;
- the lateral striker is formed by a bar that extends parallel to the active straight run of the belt and in the region of a longitudinal lateral edge of the support and running surface, opposite to the belt;
- the dragging element and the bar can translate sidewise in relation to the containers size, maintaining said containers always centered with respect to a median line traced between them and crossing operative means located along the longitudinal extension of the conveyor.

In a first preferred embodiment, the belt is made of a synthetic material and is provided with dragging cogs made on the inner surface of a closed loop defined by the belt.

In a second preferred embodiment the belt is made of a metallic material and the seats have inclined edges featuring flanges folded downwards.

The dragging element and the striker are made in such a way and controlled by such means that they produce corresponding references for the bottles to be moved.

Other features and variants of constructive details are pointed out in the subsequent dependent claims.

BRIEF DESCRIPTION OF THE DRAWINGS

Other characteristics of the invention, not pointed out yet, will become apparent from the following detailed description with specific reference to the enclosed drawings, in which:

FIG. 1 is a plan schematic view of the device being the subject of the present invention;

FIGS. 2a and 2b show a detailed view of a part of the device with two container having different dimensions;

FIGS. 3a and 3b show a part of a belt made of synthetic material;

FIG. 4 is a section view of the belt illustrated in FIGS. 3a and 3b, taken along the line IV—IV;

FIG. 5 shows a part of the belt made of metallic material;

FIG. 6 is a section view of the device taken along the line V—VI of the FIG. 1.

BEST MODES OF CARRYING OUT THE INVENTION

With reference to the previously described figures, the device for conveying containers 1, in particular bottles, through different working stations, not shown in the drawings, since generally known, includes a stationary support element 4, that forms a surface 5 on which the containers 1 are supported and moved.

A dragging element 9,10 engages and moves the containers 1 resting on the surface 5, and a lateral striker 7 acts on the containers 1 so as to keep them engaged with the dragging element 9, 10.

Both dragging element and support element form lateral references for the bottles being conveyed.

In the illustrated device, that is a non-limitative example, the dragging element 9,10 is situated in the region of a lateral longitudinal edge 6 of the support element 4, while the lateral striker 7 is situated on the opposite side of the support element 4.

The dragging element 9,10 is formed by an endless belt, that has seats 3,19 made along its longitudinal edge. The seats 3,19 are turned toward the lateral striker 7 and located over a corresponding area of the support and running surface 5.

The width of the seats 3,19 decreases while extending toward the other side of the belt. The seats are regularly spaced out.

The belt 9,10 is connected to drive means and its rotation axes are perpendicular to the orientation of the support and running surface 5.

The belt can be made of a synthetic material, as indicated with 9 in the FIGS. 3a and 3b, and in this case, it features dragging cogs made on the inner surface of the closed-loop defined by the belt (see also FIG. 4).

According to known techniques, the inside of the belt can be provided with steel filaments, so as to increase its resistance and rigidity.

Otherwise, the belt can be completely made of metallic material, e.g. steel, and in this case its opposite surfaces, resting on the supporting rollers, are smooth, while the inclined edges of the seats 19 have a flange 21 folded downwards, as seen in the example indicated with 10 in FIG. 5.

The flange 21 widens the surface of the metallic belt which exerts a pushing action on the containers.

Moreover, the flange 21 increases the transversal rigidity of the protruding parts of the belt, between which the seats 19 are delimited.

In this case, the belt can be dragged by using slots or holes 20, made longitudinally along the belt and regularly spaced apart, which engage with corresponding pins of a suitable moving device (see the Italian Patent Application No. B096A 000649 filed on Dec. 12, 1996 by the same Applicant).

The lateral striker 7, situated on the side of the support element 4 opposite with respect to the belt 9,10, is formed by a bar extending parallel to the straight active run 8 of the belt.

Both the bar 7 and the support element 4 can translate sidewise with respect to a median ideal line M traced between them and crossing the working means located along the longitudinal extension of the conveying device, as appears evident in FIG. 6.

The sidewise reciprocal motion by which the bar 7 and the support element 4 are moved closer to or farther from each other, serves for varying the spaces left between the bar 7 and the seats 3,19 of the belt in relation to the dimension of the containers 1.

It is to be noted that the "V"-shape of the seats 3, 19 allows to use the same belt for a wide range of bottles, without the necessity for frequent time-consuming substitutions.

The amplitude ratio between the sidewise movements of the belt and the lateral bar is so determined to keep the bottles always centered with respect to the median line M, and therefore with respect to the working means, e.g. filling nozzles.

The support and running surface 5 has one or more indentation 14, in the regions of which there are placed auxiliary means 13, which restore the surface 5 continuity.

The auxiliary means 13 are controlled by operative means, not shown as not concerned with the present invention, that allow the performance of additional operations on the containers 1.

For this purpose, in this case, the belt 9,10 is moved stepwise and the auxiliary means 13 are activated during the breaks of the belt movement.

Also the auxiliary means 13 are moved sidewise so as to disengage from the belt 9,10 one or more bottles 1 supported thereby.

At the same time, a corresponding section 12 of the bar 7 is moved sidewise.

When the movement is completed, the bottle 1 is free and can undergo additional operations, e.g. weighing (see, for instance the corresponding Patent Application No. B096A 000650 filed on Dec. 12, 1996 by the same Applicant).

Operation of the described device can be easily understood from the enclosed drawings.

The bottles 1 are fed to the device by a feeding line, not shown.

The bottles 1 are picked up from this feeding line by one or more carrousel devices 15,16, which space out the containers 1 and set them at a regular distance in accordance with the distance between the axes of the seats 3,19 of the belt 9,10.

The bottles 1 are brought in the region of the belt 9,10 due to rotation of the carrousel conveyors 15,16. Deviation plates 17, suitably located, facilitate the introduction of the bottles into the respective seats 3,19. The belt forms a first lateral reference for the containers.

Subsequently, the containers are kept in the seats by the bar 7, that forms a second lateral reference therefor.

By moving the bar 7 in the direction S, and of the belt 9, 10 in the direction T, i.e. away from each other as shown in FIG. 2b, the space between the edges of the seats and the corresponding internal edge of the bar is increased, and containers of bigger diameter can be introduced therebetween while maintaining them always in the correct centred position due to the "V"-form of the seats 3,19.

In order to create centered conditions, it is necessary, as has already been mentioned, to move not only the bar 7, but also the assembly supporting the containers with a predetermined ratio, so as to maintain always the central point of the containers in the seats 3,19 on the median line M.

The device constructive simplicity appears evident, since there are not elements connected to the belt for making seats, and thus all the problems deriving from the presence of these additional elements are eliminated.

The cogs 11 of the belt 9, as well as the holes 20 in case of metallic belt 10, allow to obtain the best belt dragging action and permit to set a phase relationship between the containers position and the location of working stations along the conveyor.

In other words, once the machine has been started, it is always possible to know the position of a predetermined bottle, as they move along the support and running surface 5.

This is made possible by the positive movement obtained by means of the belt provided with seats 3,19, inside which the bottles are introduced.

Finally, all the characteristics listed above allow advantageously and with extreme practicality, to place the conveyor inside closed and limited environments, e.g. sterile or controlled atmosphere.

A particularly important advantage obtained by the belt conveyor lies in the fact that the cleaning and sterilisation operations are extremely easy and safe.

In fact, the belt does not have hollows or areas difficult to reach, that could house dirt or dust, as could occur if extensions were present.

The above description is intended purely in terms of exemplification, so any variations in practice from the above technical description are to be considered within the terms of this application and the following claims.

What is claimed is:

1. A conveyor for carrying containers through different work stations comprising:

at least one stationary support element (4) that forms a support and running surface (5) for the containers (1);

at least one dragging element (9,10), for engaging and moving the containers (1) resting on the support and running surface (5), said dragging element (9,10) being formed by an endless belt and being provided with a plurality of seats (3,19) decreasing in width towards a center of the belt;

at least one lateral striker (7) for said containers (1), for enabling said dragging means (9,10) to engage and move said containers (1), said lateral striker (7) being formed by a bar that extends parallel to said belt, the lateral striker disposed adjacent to a longitudinal lateral edge (6) of said support and running surface (5), the lateral striker located opposite to said endless belt;

the plurality of seats (3,19) being regularly spaced along said support and running surface (5) for receiving said containers (1);

said endless belt (9,10) being disposed along the lateral longitudinal edge (6) of the support element (4);

said plurality of seats (3,19) being made directly in an edge of said endless belt facing said lateral striker (7)

said dragging element (9,10) and said lateral striker being translatable sideways, in relation to a size of said containers (1), such that said containers are centerable with respect to a median line (M) traced between said dragging element and said lateral striker, and are aligned with work stations located along the conveyor.

2. The conveyor of claim 1 wherein said endless belt (9) is made of a synthetic material and has dragging cogs (11) provided on an inner surface of a closed loop defined by said endless belt.

3. The conveyor of claim 1 wherein said endless belt (10) is made of a metallic material and said seats (19) have an inclined flanged edge (21) folded downwards.

4. The conveyor of claim 1 wherein said support and running surface (5) is provided with at least one indentation (14), and further comprising a movable auxiliary element (13) disposed in proximity to the indentation for providing surface continuity in said support and running surface.

5. The conveyor of claim 4 wherein said auxiliary element (13) is movable in a sideways direction so as to disengage at least one container supported thereon from the endless belt (9,10), a corresponding section (12) of the bar (7) being movable sideways therewith.

6. The conveyor of claim 1 wherein said support element and said endless belt are movable together in a direction (T), said lateral striker (7) being movable in a direction (S) opposite to said direction (T), such that when a size of the containers (1) is changed, said containers (1) are centered by said support element, said endless belt and said lateral striker with respect to a median line (M) and are aligned with respect to said work stations located along the conveyor.

* * * * *